United States Patent
Kirby et al.

(10) Patent No.: US 10,196,315 B2
(45) Date of Patent: Feb. 5, 2019

(54) MELT INFILTRATION WITH SIGA AND/OR SILN ALLOYS

(71) Applicant: General Electric Company, Schenectady, NY (US)

(72) Inventors: Glen Harold Kirby, Liberty Township, OH (US); James Dale Steibel, Mason, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/403,633

(22) Filed: Jan. 11, 2017

(65) Prior Publication Data

US 2018/0194689 A1    Jul. 12, 2018

(51) Int. Cl.
  *C04B 35/56* (2006.01)
  *C04B 35/80* (2006.01)
  *C04B 35/565* (2006.01)

(52) U.S. Cl.
  CPC .......... *C04B 35/806* (2013.01); *C04B 35/565* (2013.01); *C04B 2235/3826* (2013.01); *C04B 2235/428* (2013.01); *C04B 2235/524* (2013.01); *C04B 2235/5244* (2013.01)

(58) Field of Classification Search
  CPC ..... C30B 13/00; C30B 29/06; G02F 1/13454; H01L 21/02532; H01L 21/02625; H01L 29/42384; H01L 29/78603
  See application file for complete search history.

(56) References Cited

U.S. PATENT DOCUMENTS

| | | | | |
|---|---|---|---|---|
| 6,492,190 B2* | 12/2002 | Yamanaka | ............. | C30B 13/00 257/E21.115 |
| 6,696,309 B2* | 2/2004 | Yamanaka | .......... | H01L 27/1203 257/E27.111 |
| 9,523,149 B2 | 12/2016 | Lazur et al. | | |
| 2011/0045662 A1* | 2/2011 | Iacopi | ................ | H01L 21/0237 438/488 |
| 2013/0167374 A1 | 7/2013 | Kirby et al. | | |
| 2013/0287941 A1* | 10/2013 | Gray | .................... | B05D 3/107 427/228 |
| 2014/0072736 A1* | 3/2014 | Gray | .................... | C04B 35/573 428/34.4 |

(Continued)

FOREIGN PATENT DOCUMENTS

JP    2015212215 A    11/2015

OTHER PUBLICATIONS

Olesinski, R W. et al., "The Ga—Si (Gallium-Silicon) system", Bulletin of alloy phase diagrams, vol. 6, No. 4, pp. 362-364, 1985.

(Continued)

*Primary Examiner* — Noah S Wiese
(74) *Attorney, Agent, or Firm* — General Electric Company; William Andes

(57) ABSTRACT

Methods for forming a ceramic matrix composite (CMC) are generally provided. The method may include melt infiltrating a silicon mixture into a ceramic matrix composite preform, with the silicon mixture including SiGa, SiIn, or a mixture thereof. The silicon mixture may include silicon metal in combination with SiGa, SiIn, or the mixture thereof. Additionally, the silicon mixture may further include B within the SiGa, SiIn, or the mixture thereof (e.g., in the form of SiBGa, SiBIn, or a mixture thereof).

7 Claims, 2 Drawing Sheets

(56) References Cited

U.S. PATENT DOCUMENTS

2017/0015592 A1    1/2017  Gray

OTHER PUBLICATIONS

Olesinski, R. W. et al., "The In—Si (Indium-Silicon) system", Bulletin of alloy phase diagrams, vol. 6, No. 2, pp. 128-130, 1985.
International Search Report and Written Opinion issued in connection with corresponding PCT Application No. PCT/ dated Mar. 19, 2018.

* cited by examiner

MELT INFILTRATION WITH SIGA AND/OR SILN ALLOYS

FIELD

The present invention generally relates to ceramic matrix composite (CMC) articles and processes for their production. More particularly, a melt infiltration process is provided that uses an infiltrant that contains Ga, In, and/or B (e.g., of a silicon-gallium alloy and/or a silicon-indium alloy) to form silicon carbide fiber reinforced silicon carbide composites.

BACKGROUND

Higher operating temperatures for gas turbine engines are continuously sought in order to increase their efficiency. Though significant advances in high temperature capabilities have been achieved through formulation of iron, nickel and cobalt-base superalloys, alternative materials have been investigated. CMC materials are a notable example because their high temperature capabilities can significantly reduce cooling air requirements. CMC materials generally comprise a ceramic fiber reinforcement material embedded in a ceramic matrix material. The reinforcement material may be discontinuous short fibers dispersed in the matrix material or continuous fibers or fiber bundles oriented within the matrix material, and serves as the load-bearing constituent of the CMC. In turn, the ceramic matrix protects the reinforcement material, maintains the orientation of its fibers, and serves to dissipate loads to the reinforcement material. Individual fibers (filaments) are often coated with a release agent, such as boron nitride (BN), to form a de-bond layer that allows for limited and controlled slip between the fibers and the ceramic matrix material.

Continuous fiber reinforced ceramic composites (CFCC) are a type of CMC that offers light weight, high strength, and high stiffness for a variety of high temperature load-bearing applications, including shrouds, combustor liners, vanes, blades, and other high-temperature components of gas turbine engines. A CFCC material is generally characterized by continuous fibers (filaments) that may be arranged to form a unidirectional array of fibers, or bundled in tows that are arranged to form a unidirectional array of tows, or bundled in tows that are woven to form a two-dimensional fabric or woven or braided to form a three-dimensional fabric. For three-dimensional fabrics, sets of unidirectional tows may, for example, be interwoven transverse to each other. Of particular interest to high-temperature applications are silicon-based composites, such as silicon carbide (SiC) as the matrix and/or reinforcement material. SiC fibers have also been used as a reinforcement material for a variety of other ceramic matrix materials, including titanium carbide (TiC), silicon nitride ($Si_3N_4$), and alumina ($Al_2O_3$).

The fabrication of CMCs typically involves the use of multiple prepreg layers, each in the form of a "tape" comprising the desired ceramic fiber reinforcement material, one or more precursors of the CMC matrix material, and organic resin binders. According to conventional practice, prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials that are ultimately converted to SiC upon reaction with molten Si. Other typical slurry ingredients include organic binders that promote the pliability of prepreg tapes, and solvents for the binders that promote the fluidity of the slurry to enable impregnation of the fiber reinforcement material.

After allowing the slurry to partially dry and, if appropriate, partially curing the binders (B-staging), the resulting prepreg tape is laid-up with other tapes, and then debulked and, if appropriate, cured while subjected to elevated pressures and temperatures to produce a preform. The preform is then heated (fired) in a vacuum or inert atmosphere to decompose the binders, remove solvents, and convert the precursor to the desired ceramic matrix material. Due to decomposition of the binders, the result is a porous CMC body that may undergo melt infiltration (MI) to fill the porosity and yield the CMC component. Melt-infiltration processes used to produce SiC matrices generally entail infiltrating the porous CMC body with molten silicon supplied externally. The molten silicon infiltrates into the porosity, reacts with the carbon content of the matrix to form silicon carbide, and fills the porosity to yield the desired CMC component.

CMCs and CFCCs articles produced to contain silicon carbide fibers in a silicon carbide matrix in the manner discussed above contain residual silicon metal, which is typically in a continuous phase interwoven between silicon carbide grains that have a small grain size and limited connectivity between adjacent grains.

This silicon phase softens and eventually melts at temperature exceeding about 1204° C., limiting the capability of the MI CMC. Moreover, even if the silicon phase is removed by an extraction process, the resulting silicon carbide material in the CMC is porous and not well-connected, making it a weak phase relative to the fiber. Thus, mechanical load that can be applied is limited at temperatures exceeding 1204° C. even for silicon extracted CMC, since the matrix can crack effectively transferring the load completely to the fibers. Such phenomena results in short creep rupture lives.

As such, a need exists for an improved CMC with higher temperature capabilities, along with methods of its manufacture.

BRIEF DESCRIPTION

Aspects and advantages will be set forth in part in the following description, or may be obvious from the description, or may be learned through practice of the invention.

Methods are generally provided for forming a ceramic matrix composite (CMC). In one embodiment, the method includes melt infiltrating a silicon mixture into a ceramic matrix composite preform, with the silicon mixture including SiGa, SiIn, or a mixture thereof. For example, the silicon mixture may include silicon metal in combination with SiGa, SiIn, or the mixture thereof. In one embodiment, the silicon mixture further includes B within the SiGa, SiIn, or the mixture thereof (e.g., in the form of SiBGa, SiBIn, or a mixture thereof).

In one embodiment, the silicon mixture is melt infiltrated into the ceramic matrix composite preform at an infiltration temperature that is about 1414° C. or less (e.g., at an infiltration temperature that is about 1375° C. to about 1410° C.). In an alternative embodiment, the silicon mixture is melt infiltrated into the ceramic matrix composite preform at an infiltration temperature of about 1415° C. or higher (e.g., about 1420° C. to about 1500° C.).

The method may further include, after melt infiltration, extracting any residual Ga and/or In from the CMC.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
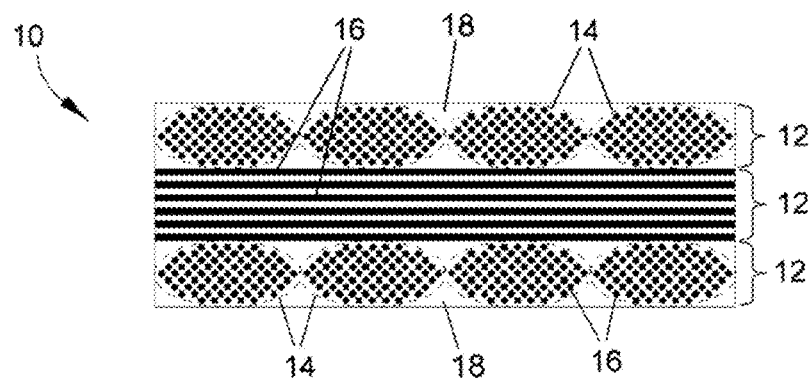
FIG. 1 schematically represents a fragmentary cross-sectional view of an exemplary CFCC article.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

Methods are generally provided for forming CMC articles, including CFCC articles, which may be used at operating temperatures exceeding the melting point of low-melting silicon alloys (for example, about 1357° C.) and exceeding the melting point of silicon and low-melting alloys thereof (e.g., up to temperatures of at least 1480° C.). In particular embodiments, the CMC materials are silicon containing CMC materials, such as CMC's containing silicon carbide as the reinforcement and/or matrix material, a particular example of which is continuous silicon carbide fibers in a matrix of silicon carbide. However, other silicon-containing materials are also within the scope of the invention, including ceramics such as silicon nitride and silicides (intermetallics) such as niobium silicide and molybdenum silicide.

In particular, melt infiltration techniques used during the formation of the CMC components are generally provided.

Figure 2:
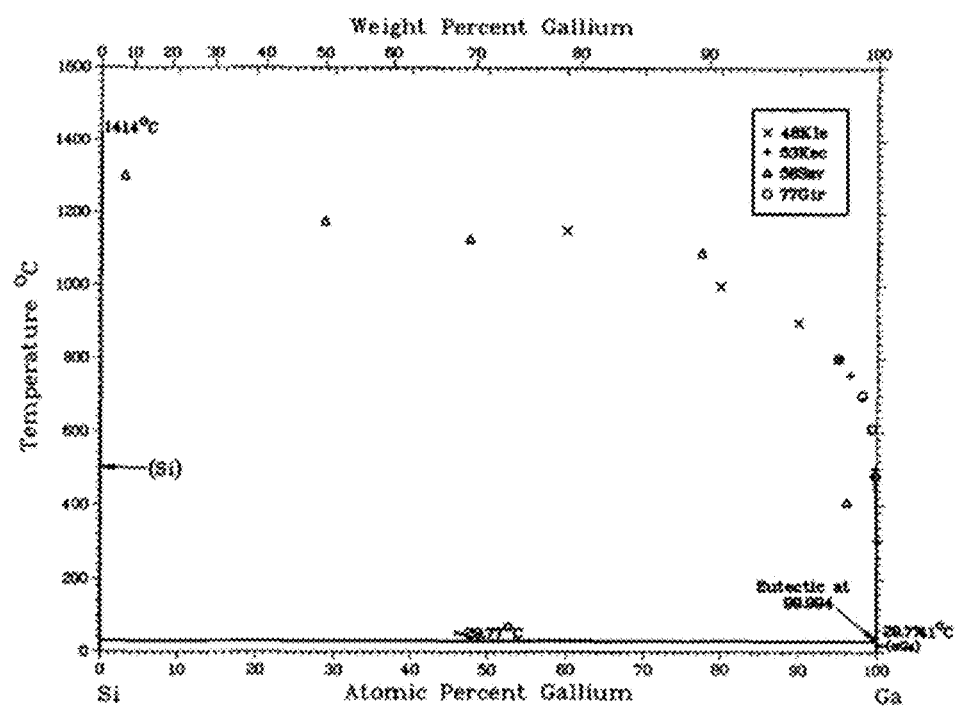
FIG. 2 shows a phase diagram for SiGa and indicates that the melting point of SiGa decreases as the relative amount of Ga increases.
Figure 3:
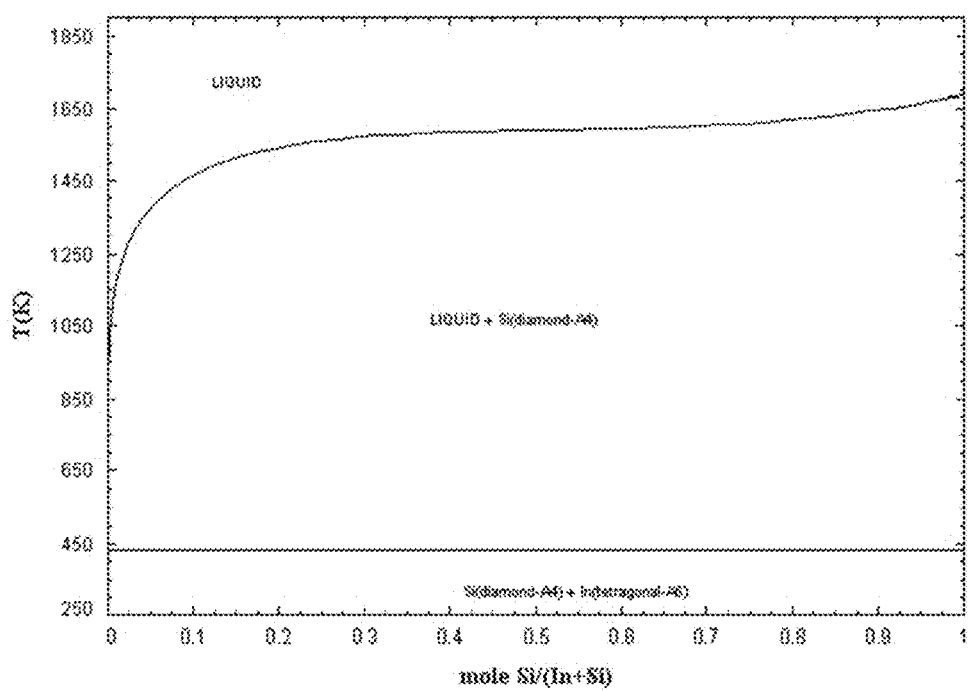
FIG. 3 shows a phase diagram is shown for SiIn and indicates that the melting point of SiIn decreases as the relative amount of In increases.

In one embodiment, the melt infiltration techniques utilize a silicon infiltration mixture that also includes gallium (Ga), indium (In), or a mixture thereof. Without wishing to be bound by any particular theory, it is believed that the inclusion of Ga and/or In in the silicon infiltration mixture lowers the melting point of the silicon infiltration mixture (from pure silicon's melting point of about 1414° C.). Referring to FIG. 2, a phase diagram is shown for SiGa, which shows that the melting point of SiGa decreases as the relative amount of Ga increases. Similarly, FIG. 3 shows a phase diagram is shown for SiIn, which shows that the melting point of SiIn decreases as the relative amount of In increases. Since neither Ga and In reacts with carbon, they are rejected back into the melt mixture during infiltration to result in even lower melting point as the Si is being consumed, and ultimately, for the residual silicon. Thus, removal of the residual silicon may be easier and performed at lower temperatures via extraction as a post-process. Ga and In also do not attack SiC, so the risk of fiber attack using this molten infiltrant is minimal.

Since the melting point of the Si—Ga and/or Si—In alloys are lower, melt infiltration may be performed at an infiltration temperature that is lower than 1414° C. (i.e., the melting point of Si), such as about 1375° C. to about 1410° C. Such lower temperatures allow for a more efficient and cost effective process for melt infiltration. Additionally, the resulting matrix may have smaller grain size that leads to higher tensile strength but less creep resistance. Such properties may be desirable in certain components. Alternatively, the infiltration temperature may be at the 1414° C. or higher to result in larger grain size and/or silicon carbide grains with better connectivity throughout the matrix, such as about 1415° C. or higher (e.g., about 1420° C. to about 1500° C.). The larger, more connected grains with robust connection points may result in a silicon carbide matrix that is more creep resistant.

In one embodiment, the silicon mixture includes an atomic percent of Ga and/or In of about 0.1% to about 20% (e.g., about 0.5% to bout 10%) prior to melt infiltrating the silicon mixture into the preform. Then, as Si is consumed during the melt infiltration process, the relative amounts of Ga and/or In in the silicon infiltration mixture increases relative to Si in order to further lower the melting temperature of the silicon infiltration mixture. For example, in particular embodiments, the silicon mixture may include about 50 atomic % or greater (e.g., about 75 atomic % or greater) of the Ga and/or In after melt infiltrating the silicon mixture into the ceramic matrix composite preform.

As stated, the silicon mixture may include silicon metal in combination with Ga and/or In, such as in the form of SiGa and/or SiIn, respectively. Other materials may also be included in the silicon infiltration mixture, such as boron (B). For example, the silicon mixture may include SiBGa and/or SiBIn. Without wishing to be bound by any particular theory, it is believed that the inclusion of boron within the infiltrant mixture helps with wetting and complete melt penetration throughout the preform.

The following discussion of CMC articles makes reference to FIG. 1, which shows an exemplary CFCC component 10 comprising multiple laminae 12, each derived from an individual prepreg that originally comprised unidirectionally-aligned tows 14 impregnated with a ceramic matrix precursor. As a result of debulking, curing and firing the laminate preform formed by the stacked prepregs, each lamina 12 contains unidirectionally-aligned fibers 16 encased in a matrix 18 that includes a silicon carbide phase that may be formed in part by conversion of the ceramic matrix precursor during firing and melt infiltration.

As a CFCC component 10, the tows 14 are shown unidirectional in each lamina 12, i.e., oriented side-by-side and parallel to each other. Suitable fiber diameters, tow diameters and center-to-center tow spacings will depend on the particular application, the thicknesses of the laminae 12, and other factors, and therefore are not represented to scale in FIG. 1. The individual fibers 16 of the tows 14 are, in one particular embodiment, coated with one or more release agents to form a de-bond fiber coating (not shown) that allows for limited and controlled slip between the matrix 18 and the tows 14 and their individual fibers 16. Suitable materials for the fiber coating include boron nitride (BN), silicon-doped BN, silicon nitride ($Si_3N_4$), silicon carbide (SiC), hafnium carbide (HfC), hafnium nitride (HfN), zirconium carbide (ZrC), zirconium nitride (ZrN), tantalum carbide (TaC), tantalum nitride (TaN), and mixtures thereof. In one particular embodiment, the fiber coating comprises multiple layers of one or more of these compounds. As cracks develop in the component 10, fibers 16 that bridge the crack act to redistribute the load to adjacent fibers 16 and regions of the matrix 18, thus inhibiting or at least slowing further propagation of the crack.

In one embodiment, a prepreg process is used to manufacture the ceramic matrix composites. In such a process, a fiber tow is wound from a drum, and then passed through a vessel where a ceramic fiber coating is applied to the tow (e.g., via a chemical vapor deposition (CVD) process). This coating serves to protect the fibers during composite processing and provides a low strength fiber-matrix interface, thereby enabling the fiber matrix debonding and fiber pull-out "toughening" mechanisms. CMC's typically in the past used carbon as the fiber coating, but have since incorporated boron nitride or silicon-doped boron nitride for increased oxidation resistance. Following fiber coating, the fiber tow is pulled through a vessel containing a slurry including the preform matrix constituents (SiC and carbon particulate, binders and solvents), and then wound on a drum to form a unidirectional pre-impregnated, i.e., "pre-preg," tape.

During the fabrication of the component 10 a desired number of prepreg tapes are laid-up to form a preform that undergoes further processing to yield the component 10. Each tape is formed to contain a reinforcement architecture (formed by the fibers 16) encased within a precursor of the desired material for the matrix 18, e.g., SiC. Thus, the use of unidirectional fiber prepreg tapes builds up the composite structure. CMC architectures derived from unidirectional prepreg offer improved mechanical properties at elevated temperatures above the melting point of silicon. It is believed that because each fiber is well-isolated via the refractory matrix phase, mechanical loads can be transferred more efficiently to each individual fiber, which in turn promotes improved mechanical properties. According to conventional practice, such prepreg tapes can be formed in a single operation, for example, by applying a precursor-containing slurry during winding of a continuous strand of tow onto a drum. Following the winding operation, the slurry is allowed to partially or completely dried, removed from the drum, cut to shape, laid-up to give the desired fiber architecture and laminated to form a green composite preform.

The preform is then placed within a chamber where fiber coatings are applied to the preform using a chemical vapor infiltration (CVI) process. The preform is then heated in vacuum or in an inert atmosphere to decompose the organic binders and yield a porous rigid preform. For example, the laminate may be heated in nitrogen, argon, or vacuum to burn out a portion of the organic binders and resins within the pores, while also converting a portion of the binders and resins to carbon char. Machining of the preform can be done at this stage, which helps to reduce the amount of final machining of the part after final densification.

The burned-out porous laminate can then be melt infiltrated by heating an external source of silicon infiltration mixture that also includes Ga, In, or a mixture thereof, as discussed above, such that it melts and flows into the laminate. A first portion of this silicon infiltration mixture reacts with the precursor carbon in the porous laminate to form silicon carbide, and a second portion of the silicon infiltration mixture fills the porosity in the laminate. The melt infiltration (MI) process is particularly suitable for use after the preform was formed with a slurry that, upon firing, results in a carbon-containing preform that preferably reacts with molten silicon to form silicon carbide. Carbon additions can also be achieved by subjecting the porous preform to direct infiltration of carbon black particles or burnout of a carbon-yielding resin that had been infiltrated into the pore space. In one embodiment, the composite preform, containing the coated SiC fibers, SiC and/or carbon particulates, and organic binders in the prepreg case, is heated to the infiltration temperature while in contact with or in proximity to the silicon infiltration mixture (e.g., a source of silicon metal that includes Ga and/or In). The molten silicon metal readily wets SiC and/or carbon, and therefore is easily pulled into the remaining porosity of the preforms by a capillary process. No external driving force is needed for the infiltration and there is no dimensional change of the composite preform.

Upon cooling, the silicon or silicon alloy filling the pore space solidifies. This silicon or silicon alloy is the desired phase to extract from the melt-infiltrated CMC to form a porous preform. In one embodiment, these processing techniques are intended to greatly improve the temperature capability of a CMC article produced by processing steps of the type described above by reducing or entirely eliminating porosity within the CMC article, as well as reducing or entirely eliminating any residual elemental silicon and/or low-melting silicon alloys in the CMC article.

The densification processes noted above can benefit from the use of certain prepreg slurries that preferably do not leave residual elemental silicon or silicon alloys in the porous preform, and preferably yield a continuous network of silicon carbide or carbon to provide strength within the porous preform prior to infiltration. Various precursor-containing slurries have been applied to continuous fibers and tows to produce prepreg tapes. Typical slurry compositions have contained, in addition to the desired ceramic precursor(s), ceramic constituents of the matrix (for example, silicon carbide), organic resins that serve as processing aids (for example, polyvinybutyral and poly isobutyl methacrylate), solvents (for example, toluene, MIBK, ethylbenzene, etc.), and plasticizers for the binders (for example, dibutyl phthalate). The slurry compositions may contain an approximately 1:1 stoichiometric mixture of elemental silicon and carbon black that react during firing of the preform (e.g., at temperatures of about 1430° C. to about 1460° C.). Alternatively or additionally, the slurry composition may additionally contain one or more organic binders that can be pyrolyzed to form a network of carbon char (for example, furanic resins and/or phenolic resins). In any case, the result is preferably a cured and rigid preform that can be essentially free of elemental silicon and silicon alloys, and in which the fibers are encased in a porous yet continuous network of silicon carbide filaments or carbon char (depending on the particulars of the embodiment as described above). This porosity can then be eliminated by the densification processes discussed above, such that the network of silicon carbide filaments or carbon char provides a scaffold for reinforcement to prevent cracking due to the stresses involved in pyrolysis of the polymeric precursor, particular during the first densification cycle.

Additional processing steps can be performed to extract any residual elemental silicon and/or low-melting silicon alloy phase within the CMC article. An extraction step is particularly desirable if a slurry is used that contains an excess of elemental silicon relative to what is needed for a 1:1 stoichiometric mixture of elemental silicon and carbon black, or if a slurry is used that does not contain any elemental silicon and a melt infiltration step is performed using an external source of elemental silicon or a silicon alloy as the infiltrant. For the latter, typical slurry compositions have contained silicon carbide, carbon black, organic resins that serve as processing aids (for example, polyvinylbutyral), organic resins that are pyrolyzed to form a network of carbon char, solvents (for example, toluene, MIBK, alcohols, and acetone), etc.), and plasticizers for the binders (for example, dibutyl phthalate).

A suitable extraction technique is a powder pack extraction process that involves surrounding the CMC article with a porous material and heating until the silicon or silicon alloy is molten. Porous materials may include, but are not limited to, carbon black, graphite, industrial diamond, silicon carbide, silicon nitride, molybdenum and its silicides, carbides and nitrides, tungsten and its silicides, carbides and nitrides, tantalum and its silicides, carbides and nitrides, and/or niobium and its silicides, carbides and nitrides. Preferred porous materials include those that provide a chemical driving force to draw out the silicon or silicon alloy, do not react strongly with the silicon carbide in the melt-infiltrated body and, in case there is a shallow reaction layer, are easily removed by grinding or grit blasting to ensure that the pore network left behind is open for subsequent infiltration. Preferred porous materials include molybdenum, tungsten, tantalum, niobium metal, and niobium silicides. These materials are capable of adequately extracting residual silicon and silicon alloy and forming metal silicides on the surface of the CMC article that are easily removed by grit blasting to expose pore channels within the CMC article. Once exposed, the pore channels can be filled with one or more precursors that can be converted to silicon carbide by a PIP, MI, or CVI technique.

Another suitable extraction technique is a liquid phase extraction process carried out by exposing the CMC article to a liquid that is corrosive to residual silicon alloy, but not to any other components of the CMC article. Examples of such liquids are hydrofluoric acid (HF), mixtures of hydrofluoric acid and other acids, strongly basic solutions such as aqueous NaOH, LiOH, KOH, etc., liquid metals such as gallium, indium, tin, and mercury, and multistage leaching processes that involve liquid metals, acids, and bases. The liquid phases can be heated to increase the rate at which they dissolve the residual silicon alloy. This is particularly true for liquid metals, which require an elevated temperature to activate the silicon alloy removal process. Heat treatments may be performed to eliminate any contaminants, for example, to evaporate fluorine or any metal in the pore channels. As before, the exposed pore channels can be filled with one or more precursors that can be converted to silicon carbide by a PIP, MI, or CVI technique.

Another suitable extraction technique is vaporization of silicon or silicon alloy at high temperature in a strong vacuum. As before, the exposed pore channels can be filled with one or more precursors that can be converted to silicon carbide by a PIP, MI, or CVI technique.

While various applications are foreseeable, particular applications for the component 10 include components of gas turbine engines, such as combustor liners, blades, vanes and shrouds within the turbine sections of gas turbines.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a ceramic matrix composite (CMC), comprising:
   melt infiltrating a silicon mixture into a ceramic matrix composite preform, wherein the silicon mixture comprises Ga, In, or a mixture thereof;
   wherein the silicon mixture is melt infiltrated into the ceramic matrix composite preform at an infiltration temperature of about 1415° C. or higher.

2. The method of claim 1, wherein the silicon mixture Is melt infiltrated into the ceramic matrix composite preform at an infiltration temperature of about 1420° C. to about 1500° C.

3. A method for forming a ceramic matrix composite (CMC), comprising:
   melt infiltrating a silicon mixture into a ceramic matrix composite preform, wherein the silicon mixture comprises Ga, In, or a mixture thereof;
   wherein the silicon mixture further comprises silicon metal in combination with Ga, In, or the mixture thereof.

4. A method for forming a ceramic matrix composite (CMC), comprising:
   melt infiltrating a silicon mixture into a ceramic matrix composite preform, wherein the silicon mixture comprises Ga, In, or a mixture thereof
   wherein the silicon mixture further comprises B within the Ga, In, or the mixture thereof.

5. The method of claim 4, wherein the silicon mixture comprises SiBGa.

6. The method of claim 4, wherein the silicon mixture comprises SiBIn.

7. A method for forming a ceramic matrix composite (CMC), comprising:
   melt infiltrating a silicon mixture into a ceramic matrix composite preform, wherein the silicon mixture comprises Ga, In, or a mixture thereof;
   further comprising:
   after melt infiltration, extracting any residual Ga and/or In from the CMC.

* * * * *